United States Patent
Humphrey

(10) Patent No.: US 10,835,076 B2
(45) Date of Patent: Nov. 17, 2020

(54) EXTENDED LIFE ROLLER GRILL

(71) Applicant: James Humphrey, Cheyenne, WY (US)

(72) Inventor: James Humphrey, Cheyenne, WY (US)

(73) Assignee: Humphrey Industrial Appliance Design & Consulting, L.L.C, Cheyenne, WY (US)

( * ) Notice: Subject to any disclaimer, the term of this patent is extended or adjusted under 35 U.S.C. 154(b) by 0 days.

(21) Appl. No.: 16/115,225

(22) Filed: Aug. 28, 2018

(65) Prior Publication Data
US 2020/0214495 A1    Jul. 9, 2020

(51) Int. Cl.
  *A47J 43/18*  (2006.01)
  *A47J 37/04*  (2006.01)
  *A47J 37/06*  (2006.01)
  *A21B 1/48*  (2006.01)

(52) U.S. Cl.
  CPC ......... *A47J 37/041* (2013.01); *A47J 37/0629* (2013.01)

(58) Field of Classification Search
  CPC ..... A47J 37/041; A47J 37/048; A47J 37/0629
  USPC ....... 99/331, 339, 343, 420, 421 R, 421 HH, 99/441, 427, 443 R, 443 C
  See application file for complete search history.

(56) References Cited

U.S. PATENT DOCUMENTS

| | | | |
|---|---|---|---|
| 2,185,979 A * | 1/1940 | Dumas | A47J 37/048 99/423 |
| 3,472,156 A * | 10/1969 | Bardeau | A47J 37/048 99/423 |
| 2005/0051037 A1 * | 3/2005 | Gaskill | A47J 37/048 99/421 R |
| 2005/0061161 A1 * | 3/2005 | Hunot | A47J 37/048 99/441 |
| 2010/0163548 A1 * | 7/2010 | Cretors | H05B 6/12 219/620 |
| 2012/0186460 A1 * | 7/2012 | Humphrey | A47J 37/048 99/339 |
| 2012/0263404 A1 * | 10/2012 | Humphrey | A47J 37/048 384/428 |
| 2013/0104750 A1 * | 5/2013 | Hankins | A47J 37/048 99/441 |
| 2013/0104751 A1 * | 5/2013 | Hampton | A47J 37/048 99/441 |
| 2014/0033929 A1 * | 2/2014 | Humphrey | F24C 7/083 99/332 |
| 2015/0223638 A1 * | 8/2015 | Davis | A23L 5/10 426/523 |
| 2017/0156545 A1 * | 6/2017 | Davis | A47J 37/048 |

* cited by examiner

*Primary Examiner* — Hung D Nguyen

(57) ABSTRACT

An extended life roller grills for re-thermalizing and merchandising food product with easily replaceable bearing assemblies, drive assembly and roller tubes. The grill is comprised of rotation of a plurality of heated internally tubes, a drive assembly that transfers rotational motion to the roller tubes from a cam or chain or gear system or cog belt attached to a motor providing rotational motion and force to the roller tubes. Roller grill chain drive or gear drives, or cog belt or cam drives that utilize replaceable bearing assemblies for extending the service life the roller grill. A cam drive assembly substantially increases the reliability, ease of assembly and disassembly, serviceability, and maintenance of the roller grill. Cam drive provides for easy removal, servicing and replacement of roller tubes not available on other drive systems for roller grills. Replaceable bearing journals to extend the life span of chain, gear, cam or belt drive grills.

9 Claims, 14 Drawing Sheets

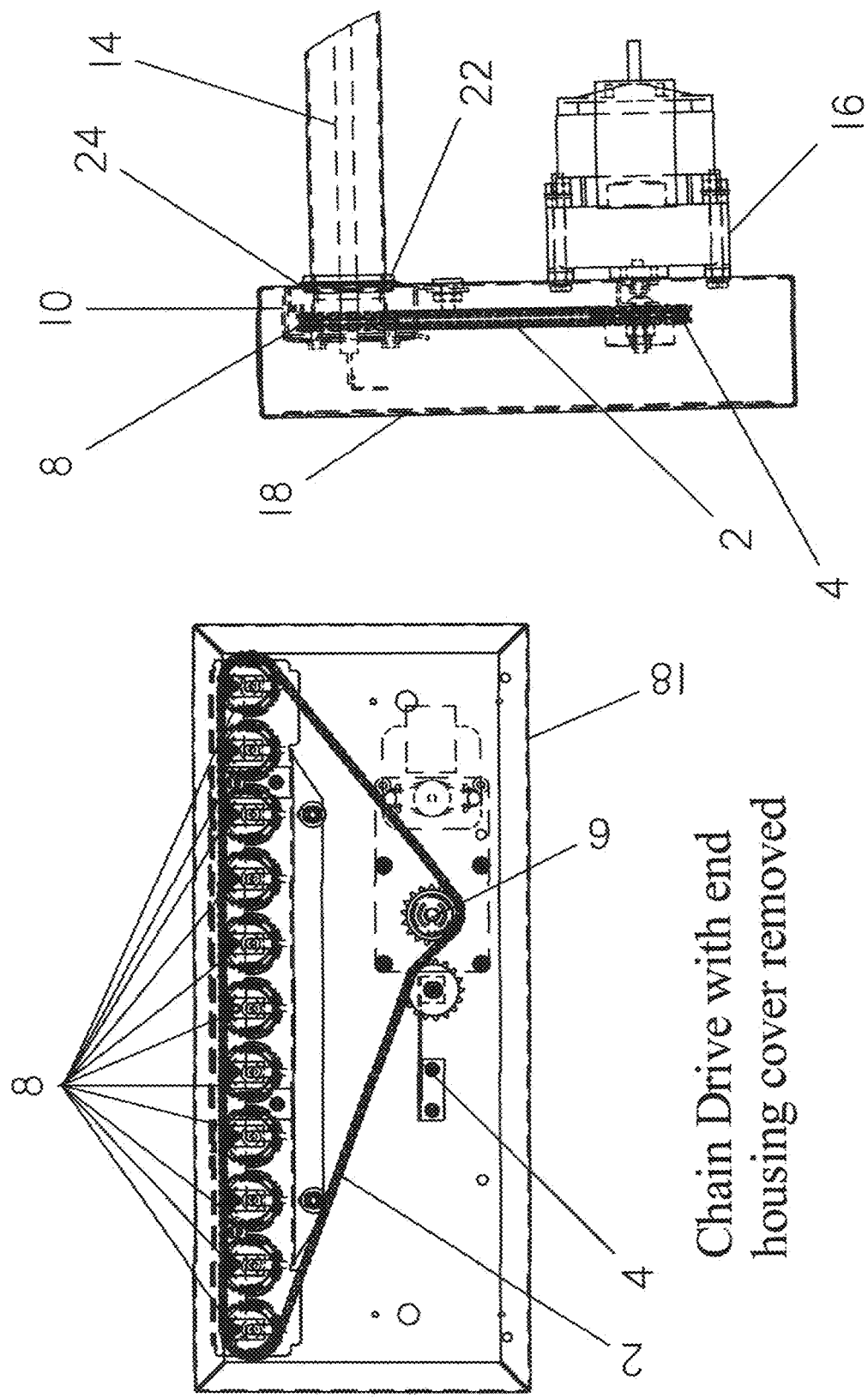

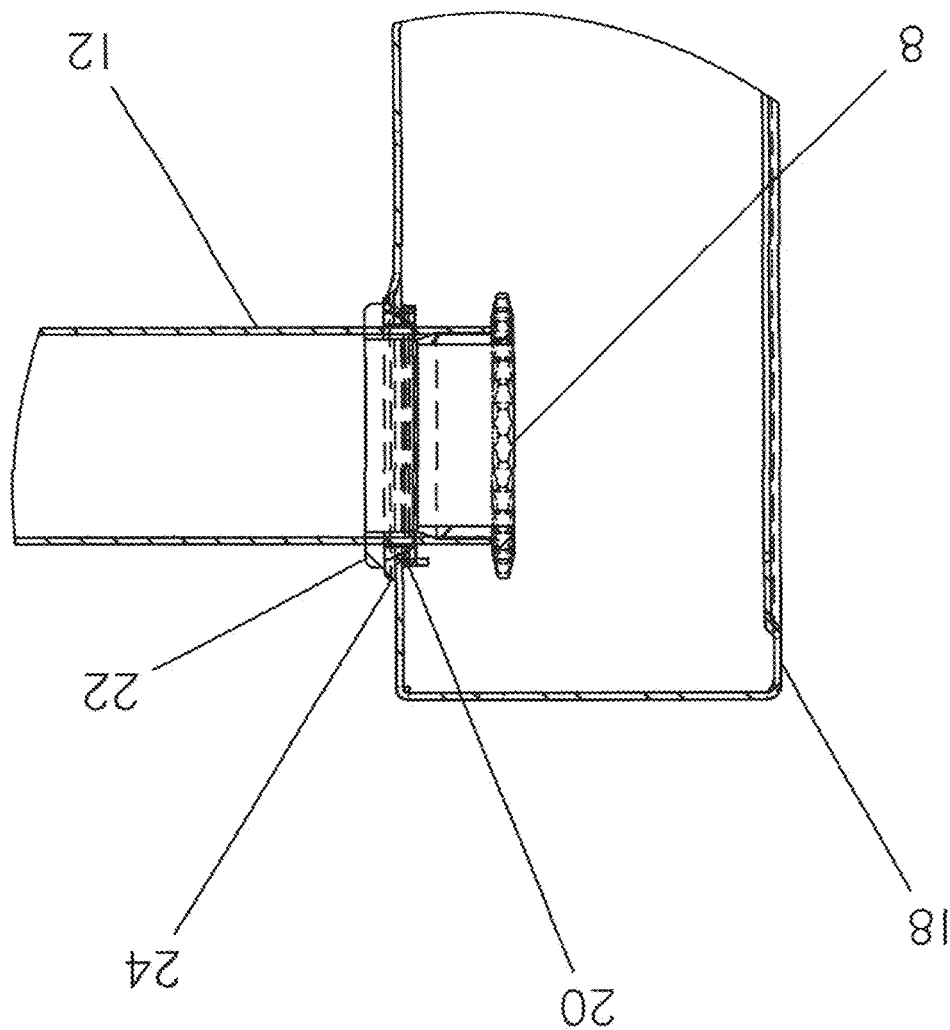
FIG. 4 — Detail C-C Bearing & Bearing Journal
Prior Art

FIG. 6  Detail C of Sec A-A

Right veiw Drive Pin & Element Support Bearing

DETAIL B

EXTENDED LIFE ROLLER GRILL

CROSS-REFERENCE TO RELATED PATENT APPLICATIONS

U.S. Patent Documents

| | | |
|---|---|---|
| 6,393,971 | May 28, 2002 | Hunot |
| 9,545,172 | Jan. 17, 2017 | Davis |
| 8,727,625 | May 20, 2014 | Humphrey |

Related U.S. Application

Provisional application No. 62/553,831, Filed on Sep. 2, 2017

The present application claims priority to the earlier filed provisional application having Ser. No. 62/553,831, and hereby incorporates subject matter of the provisional application in its entirety.

STATEMENT REGARDING FEDERALLY SPONSORED RESEARCH OR DEVELOPMENT

Not Applicable

BACKGROUND OF THE INVENTION

The invention relates to assemblies for merchandising, re-thermalizing, and holding food at safe temperatures for human consumption. Rotating food on heated tubes or rods merchandises the food product for sale in both self-service and full service applications. Clean functioning merchandisers promote food sales and non-rotating dirty equipment fails to sell food products. Rotating the product promotes the even thorough re-thermalization and holding of food at safe product temperatures for serving.

In prior art for roller grills, rotating internally heated tubes have been mounted between two housings which contain both electrical and drive components. The majority of roller grill past and present have utilized chain/sprocket drive assemblies and more recently worm gear and cog belt. These drives require precision adjustments and/or gaging to properly function, wear prematurely in service, require in service adjustment and require lot of moving parts which wear out or gum up. The drive is difficult to assemble and service in field so they are prone to stop rotating properly. These types of drives are lubricated with high temperature lubricants that are approved for food contact and due not smell or impart favor to the food. Over time the lubricants get contaminated as the food product leak by seals as seals deteriorate and the drive requires field service, disassembly, and require part and lubricant replacement. Additional problems occur for uneven force being applied to components causing premature wear of the chain, gears, bearings and housing bearing journals in which bearings are mounted. Heretofore, the drives and assemblies developed over the history of roller grills have increased in complexity, increased the number of components, and complicated the assemblies in efforts to resolve wear and increase reliability. Maintaining and servicing the roller grill requires more training, more time and cost to keep roller grills functioning correctly.

Roller tubes on grill assemblies can be clean in place by following the manufacturer's daily cleaning instructions and daily cleaning will prevent excessive carbon, caramelization, and grease build up. In practice, few users follow the daily cleaning practices properly which results in excessive buildup of burnt on food, resulting in loss of sales, fowling of chain, excessive gear wear and drive mechanisms thus wearing out of the bearings and bearing journals. The bearing journals are made as part of the housings and not replaceable or repairable. When bearing journals wear out, replacement bearing fail quickly and roller grills eventually are taken out of service and replaced with new grills.

Further, units with complex drives being shipped to the field are easily damaged from handling prior to installation. Chain tensioners are added to the drive systems to help accommodate for drive and bearing wear which add to journal wear and premature bearing failure. Chains, gears, guides become misaligned wearing components prematurely or jamming the mechanism entirely. Soft plastic bearings such as TEFLON polymer can be distorted or cut as they are forced out of alignment. TEFLON is a registered trademark of E.I Du Pont, Wilmington, Del. For its polytetrafluoroethylene polymer commonly used for food approved bearings.

SUMMARY OF THE INVENTION

It is an aspect of the invention to provide a roller grill with replaceable bearings and journals with wider wear surfaces that can be adapted to fit any type of drive, number of rollers or size of grill. The ability to replace the bearing journals further extend total grill life if bearings fail and journals are worn beyond service life.

The replaceable bearing journals can be machined or cast or molded bearing journals are to be press into, fastened to or otherwise attached to the side housings in a way that they can be replaced. The journals are made with wider flatter surfaces reducing the force across the bearing area to extend life span of bearing surfaces but can be replaced to further prolong the life of the grill.

The journals can be made as single journal or be made into a multiple journal insert as a replaceable component(s) for single or multiple rollers. These components (inserts) are attached to the side housings of the roller grill body assembly.

Another aspect of the invention is to provide a roller grill drive assembly that substantially reduces the number of components, simplifies assembly and disassembly, reduces complexity, eliminates precision alignment and adjustment, improves life expectancy and increases reliability. The drive provides a drive plate to simplify the connection to rollers and motor cam, motor with cam to provide 360 degree rotation of the rollers and reduce the number of components drive parts so rollers can be easily removed for service of the drive and rollers. A drive plate is provided to be shared by rollers and evenly distribute the force to rotate the rollers to each individual roller, bearing and bearing journal. Even distribution of the total force to rotate all rollers in the assembly is reduced by division of force required to rotate the assembly evenly to each roller, bearing and bearing journal equally. Even force distribution to each roller bearing will increase the life expectancy of the grill and its components.

Simple attachment of rollers to the drive makes assembly self-aligning, simple to assemble and disassemble, and eliminating precision adjustments for assembly and service. Drive plate is attached the side housing aligned by glide washers (wear blocks) and retained by quick release fasteners for ease of assembly.

Single ended electric resistance heaters (terminal connections on the same end) are provided to allow the drive plate to pass 360 degrees around the heated tubes. All electrical connections are located in the opposite side housing in respect to the drive plate. Temperature of the heating surfaces is controlled by time on or off (infinite controls) or thermostats with sensing probes.

Another aspect of the invention is to provide long life self-lubricated bearing surfaces for each drive pin, roller pin, element and roller tube to rotate within that does not require additional lubrication. The low pressure and speed of the drive assembly allows the use of plastic, composite bearing, and/or sintered metal bearings for maintenance free operation.

Finally, it is an aspect of the invention is to provide a method and means to easily remove single or multiple roller tube(s) with excessive burnt on food buildup for cleaning. Once roller tube is removed from the assembly, tubes can be cleaned in a bath of heated citric acid cleaning solution or NSF approved cleaning solution. Ambient temperature cleaning solution bath maybe used, but a heated solution bath removes carbon, caramelization; grease build up will reduce time required to thoroughly clean roller tubes.

BRIEF DESCRIPTION OF DRAWINGS

FIG. 2 is the right side view showing prior art chain drive apparatus.

FIG. 3 is detail A rear view of FIG. 2 prior art drive apparatus.

FIG. 4 is a detail C-C of the prior art roller grill side housing containing bearing land and assembly of roller tube bearing with roller tube.

DETAILED DESCRIPTION OF THE INVENTION

Figure 1:
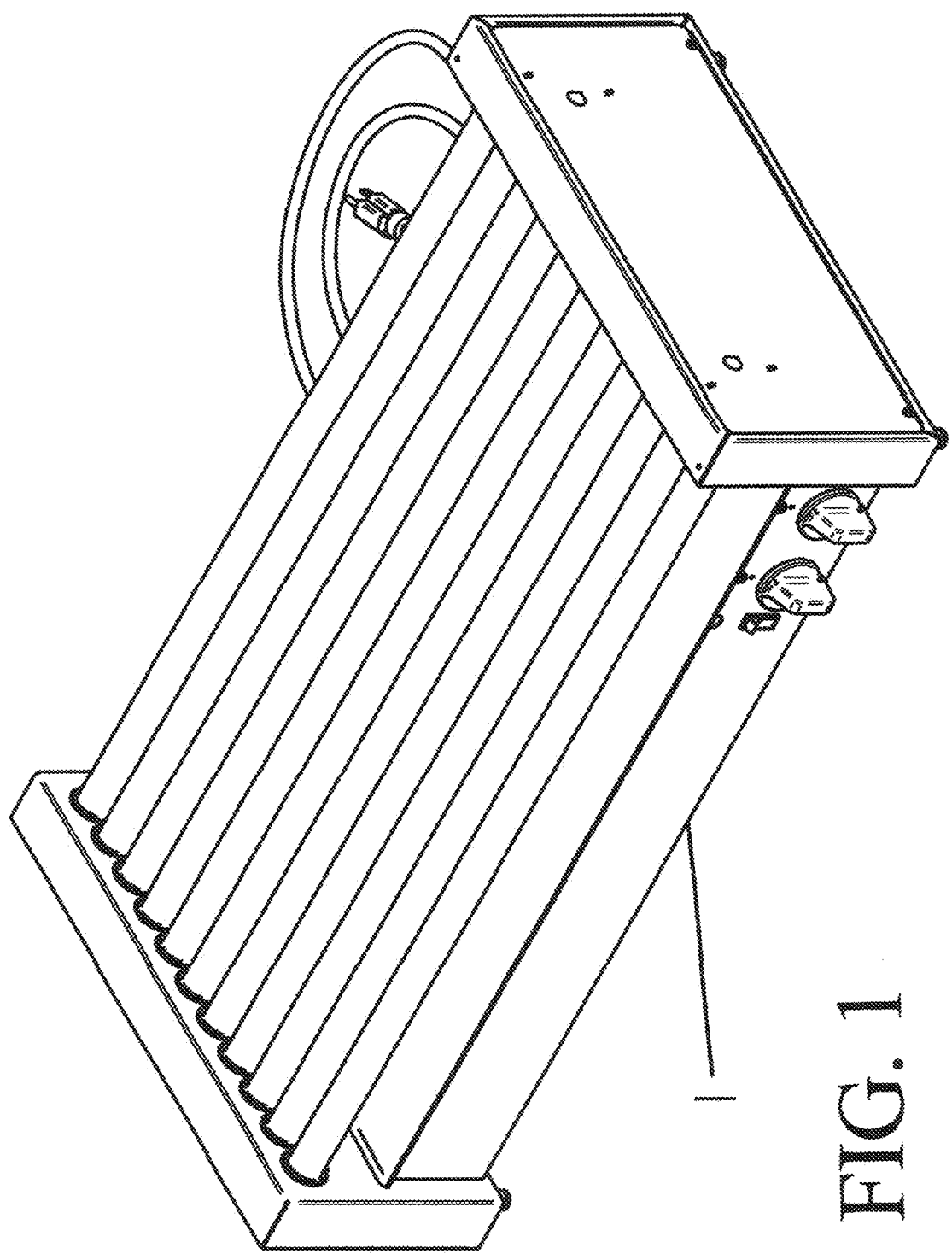
FIG. 1 is the orthogonal projection of prior art roller grill assembly.
Figure 5:
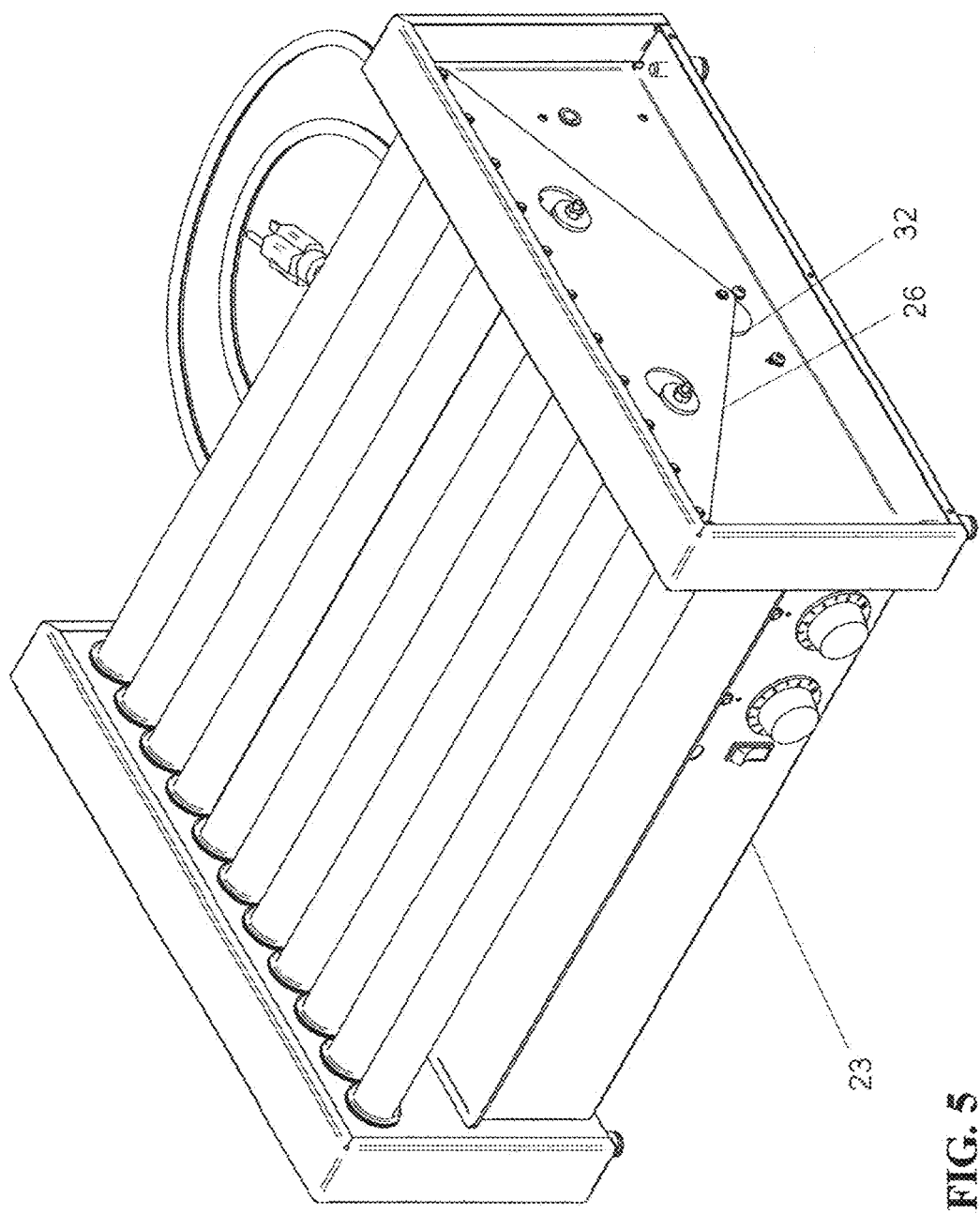
FIG. 5 is an orthographic projection of a cam drive roller grill with right side end housing cover removed to view drive assembly.

The following detailed description illustrates the invention by way of example and not by limitation. This description will clearly enable one skilled in the art to make and use the invention, adaptations, variations, alternatives and one or all variations of construction without departing from the scope of the invention.

In order to better appreciate the merits of the invention, a more detailed understanding of the prior art will be undertaken referring to FIGS. 2-4. A typical roller grill drive and bearing assembly is described. Roller grill bearing are typically machined from food grade TEFLON polymer. The typical drive is illustrated in FIGS. 2-3 chain 2 driven by drive sprocket 6 attached to motor 16. Chain 2 is routed around and over sprocket roller 8 retained and gage clearance maintained by chain guide 10. Maximum drive pressure is exerted by drive chain 2 on the outer left and right sprocket rollers 8 onto FIG. 4 bearing roller 24 and bearing land 20. Typical bearing land thickness ranges from (1.27 millimeters to formed profiles up to 4.064) 0.050 inches to 0.160 inches wide are formed into end housing 18. The bearing lands 20 that are formed on CNC sheet metal fabricators that provide lower accuracy (0.05 millimeter) 0.002 inches to (0.264 millimeter) and angles less than 90 degrees which cut into the cut soft polymer bearings 24. Life of bearing roller 24 is determined by drive pressure transferred from drive chain 2 to sprocket roller 8 to bearing roller 24 to bearing land 20. Forming of thicker bearing lands 20 into side housing 18 and using wider roller bearing 24 is normally limited to the outer left and right sprocket roller(s) 8 due to die and stripper limitations of the forming tools and internal bearing lands 20 to the thickness of the metal utilized to form end housing 18. Double ended heating element 14 is typically used in both chain and gear drive assemblies that require 360 degree rotation of the sprocket roller tube and limit the type of drive to achieve 360 degree rotation about heating element(s) 14.

Commercial roller grills are subjected to continuous nonstop use in their application. Bearing roller 24, bearing land 20 and sprocket roller 8 are the key components to determine roller grill life span. Typical drive assemblies required extensive time (over 1 hour) tear down to replace one bearing roller 24 or replace one sprocket roller tube 8. The typical life span of grills utilizing drive shown in FIGS. 2-4 is normally less than 5 years. To increase life span and service life of the roller grills, mechanisms that distribute the drive force across wider bearing surfaces, wider bearing journals and wider bearing lands is required. Mechanisms that distribute drive force across all rollers and not just maximum pressure to outer drive roller of a drive system further extend life span the roller grill. Mechanisms that disassemble easily to remove and replace a single bearing roller 24 and 38 to clean, re-coat, replace sprocket roller tubes 8 and 60 components further extend roller grill life.

Figure 6:
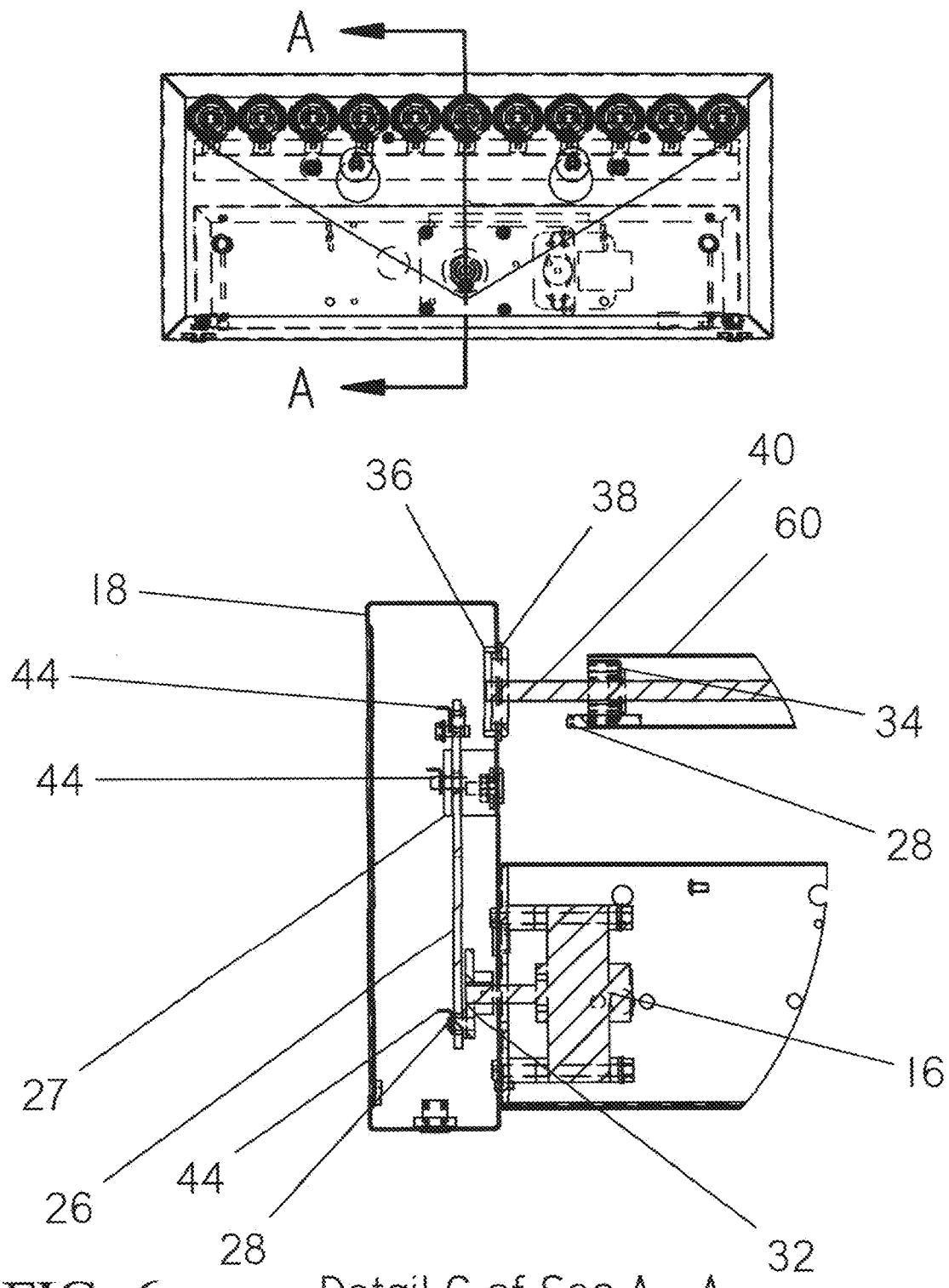
FIG. 6 is section A-A of FIG. showing cam drive connection to roller tubes.
Figure 7:
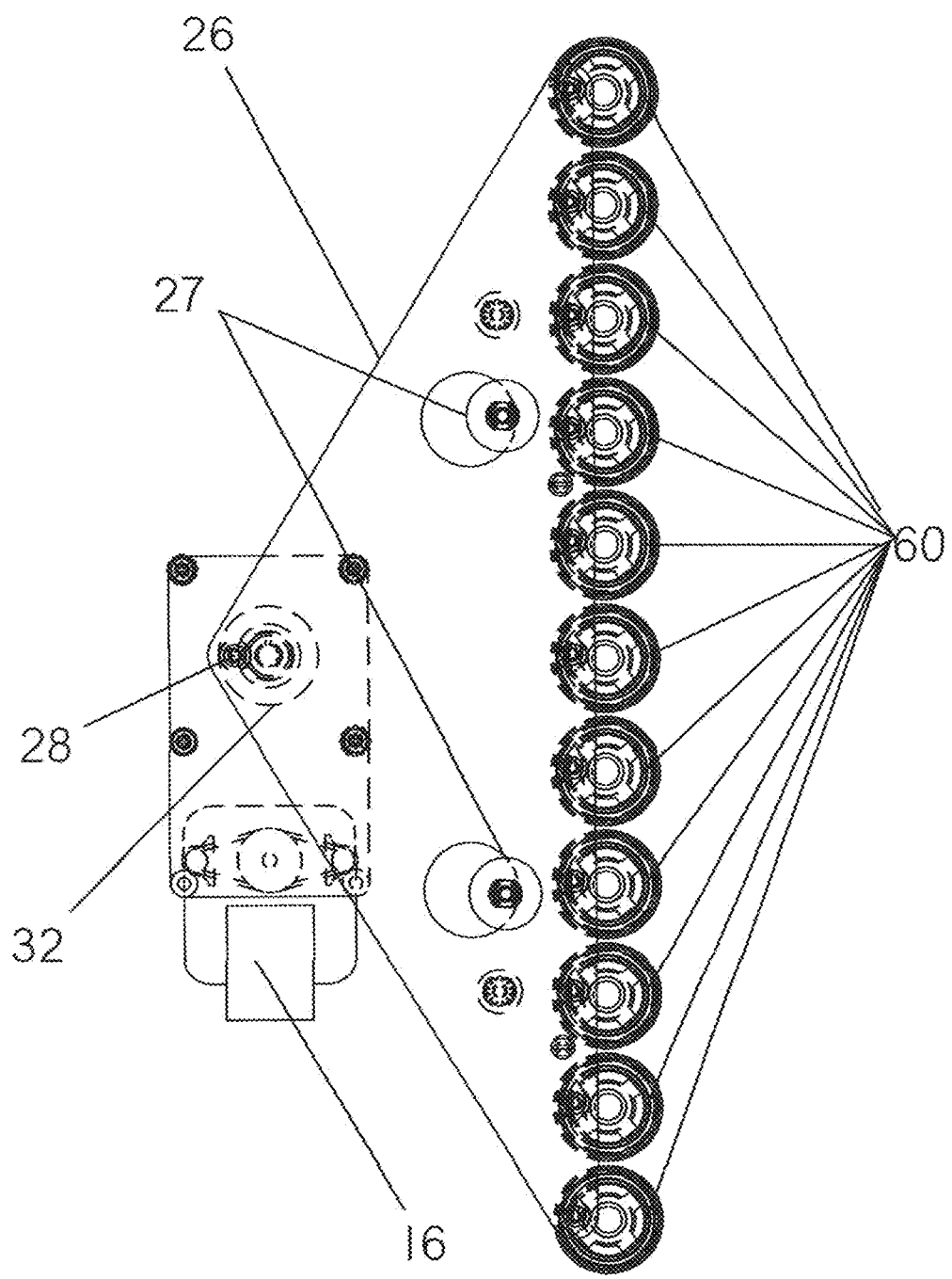
FIG. 7 is the side view of FIG. 5 with grill body and end housings removed showing relationship of cam drive to roller tubes.
Figure 8:
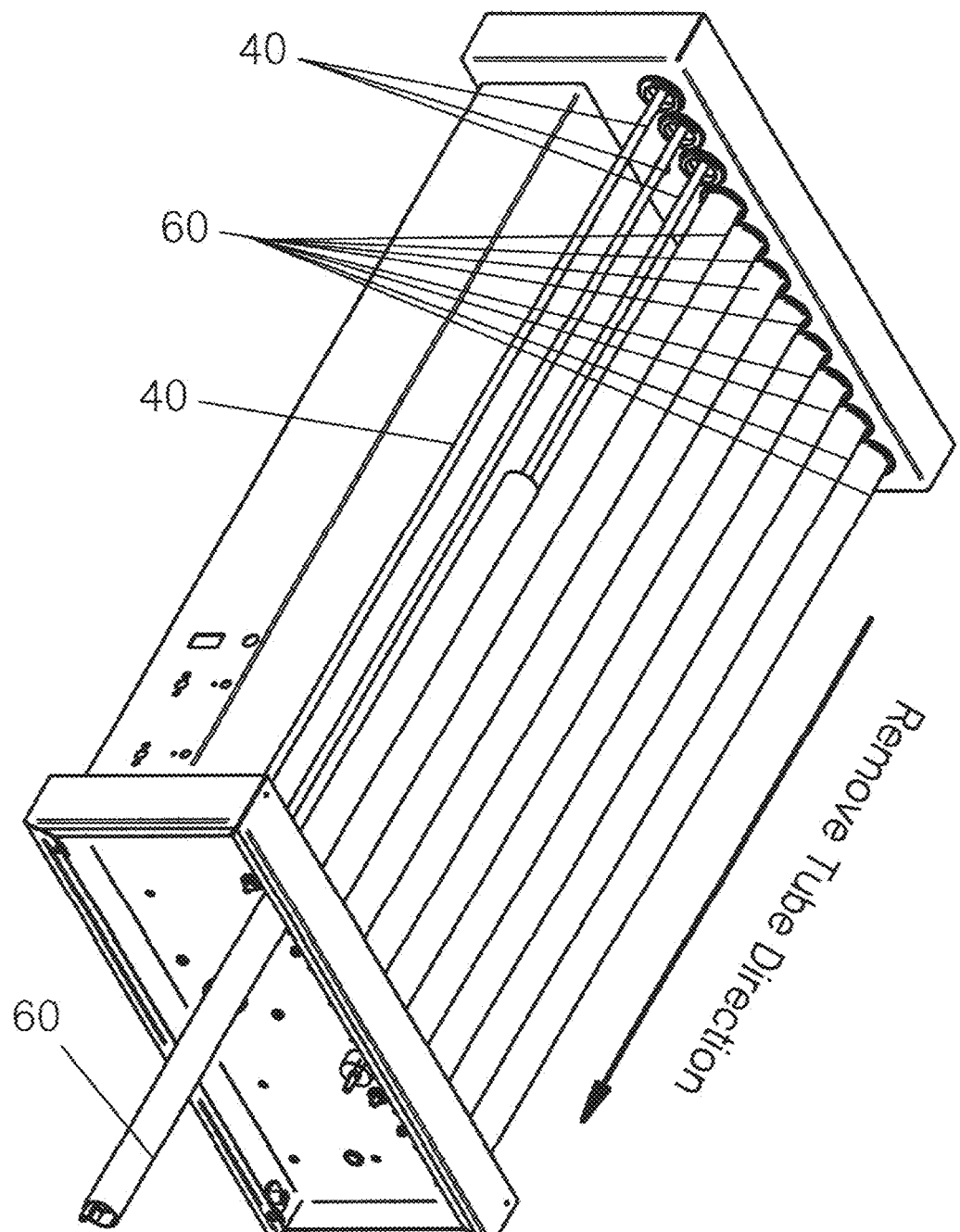
FIG. 8 is an orthographic projection of roller grill in FIG. 5 with drive plate removed and roller tubes being removed.
Figures 9, 10:
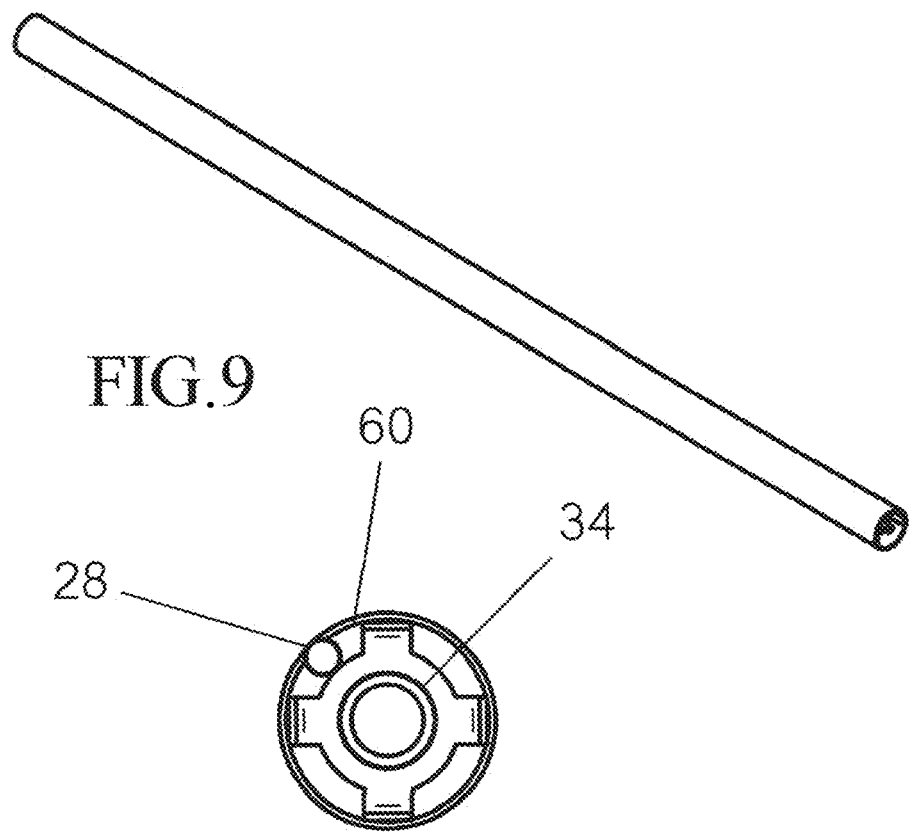
FIG. 9 is an orthographic projection of cam drive roller tube.
FIG. 10 is ride side view of FIG. 9 showing roller drive pin and single ended element bearing.
Figure 11:
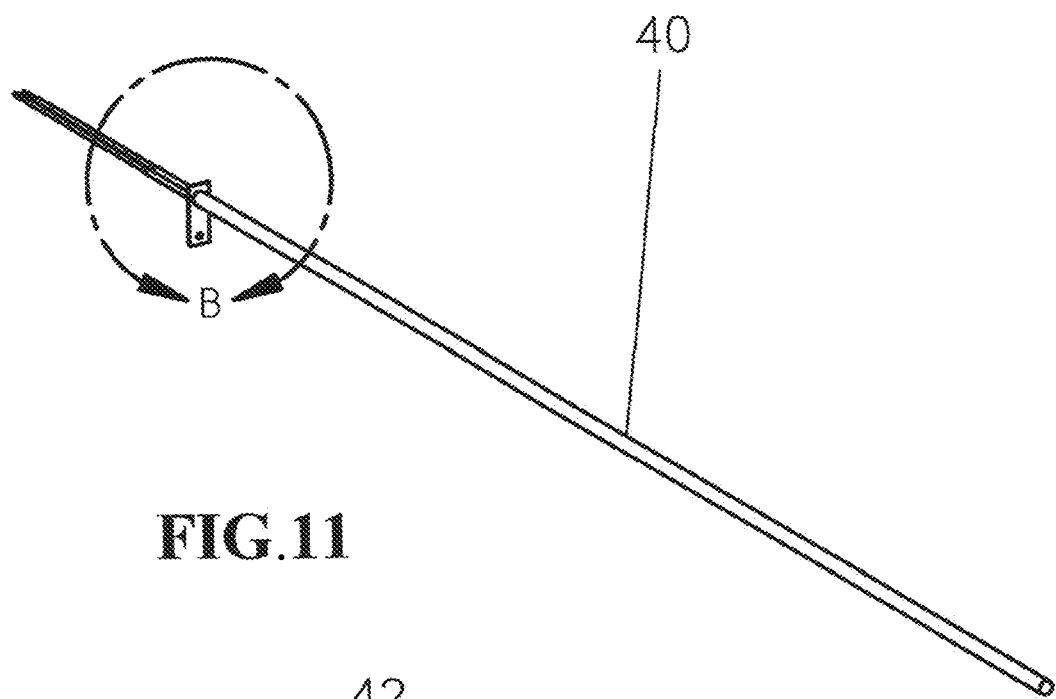
FIG. 11 is an orthographic projection of a single ended heating element.
Figure 12:
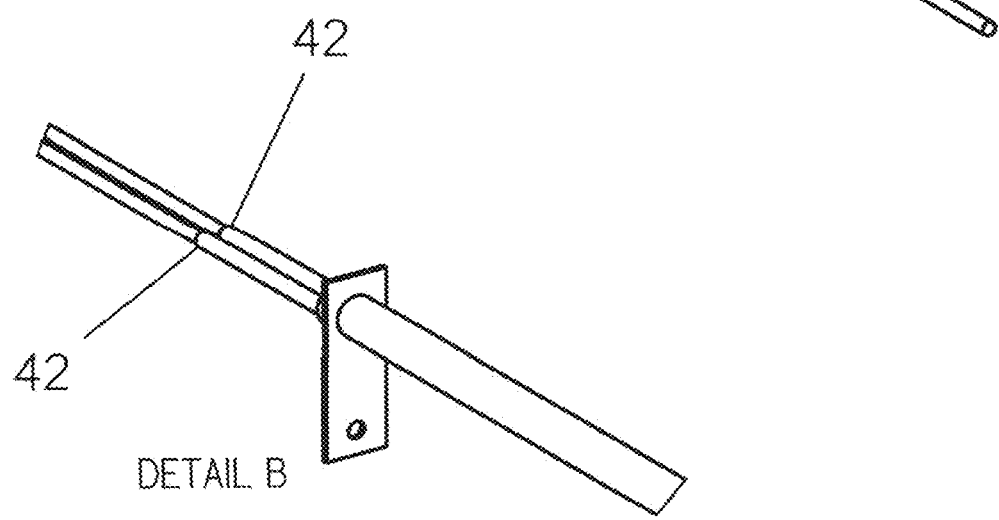
FIG. 12 is detail B of FIG. 11 showing both electrical connections on same end of the heating element.
Figure 13:
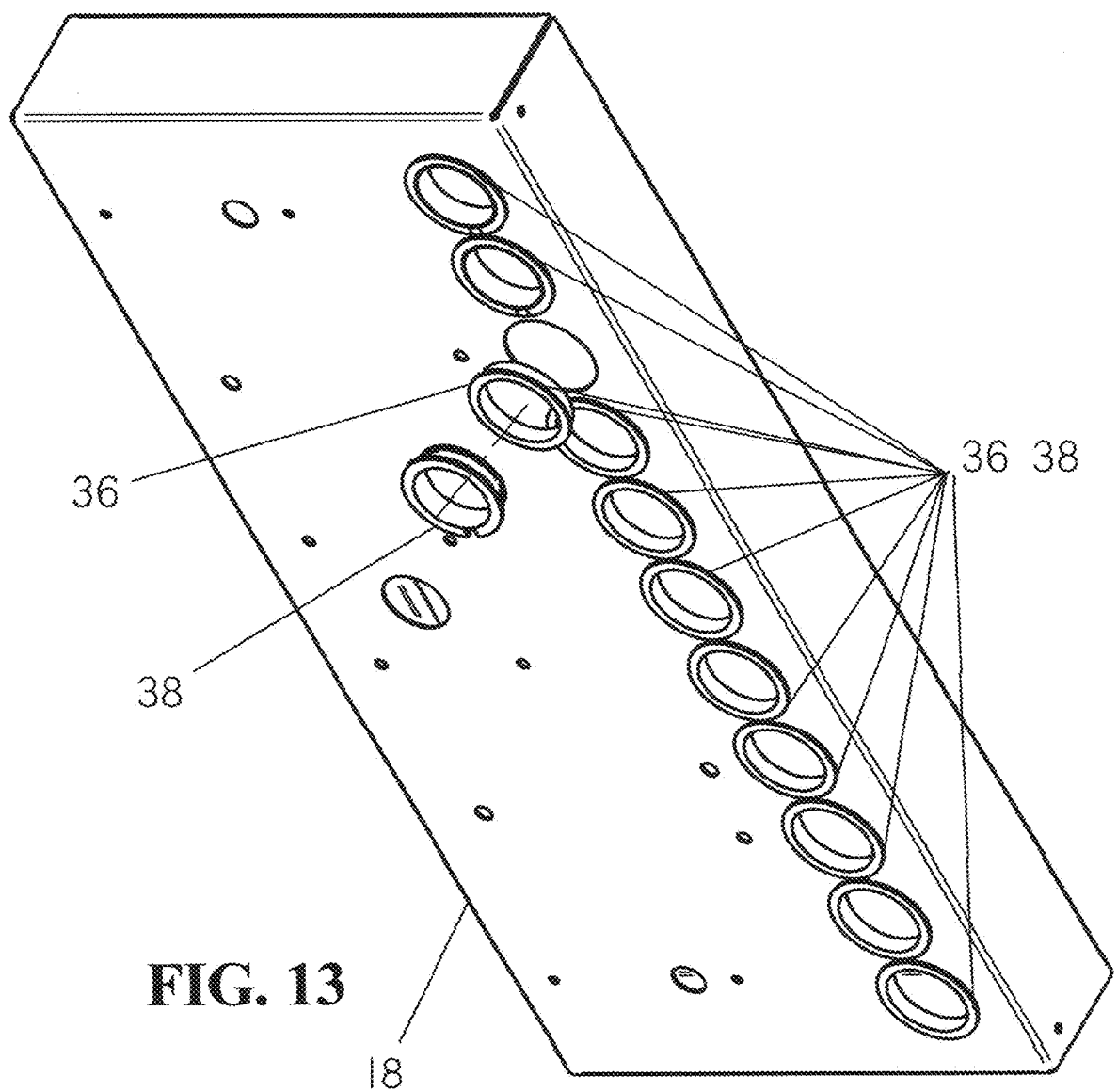
FIG. 13 is an orthographic projection of side end housing with removable and replaceable bearing journals.
Figure 14:
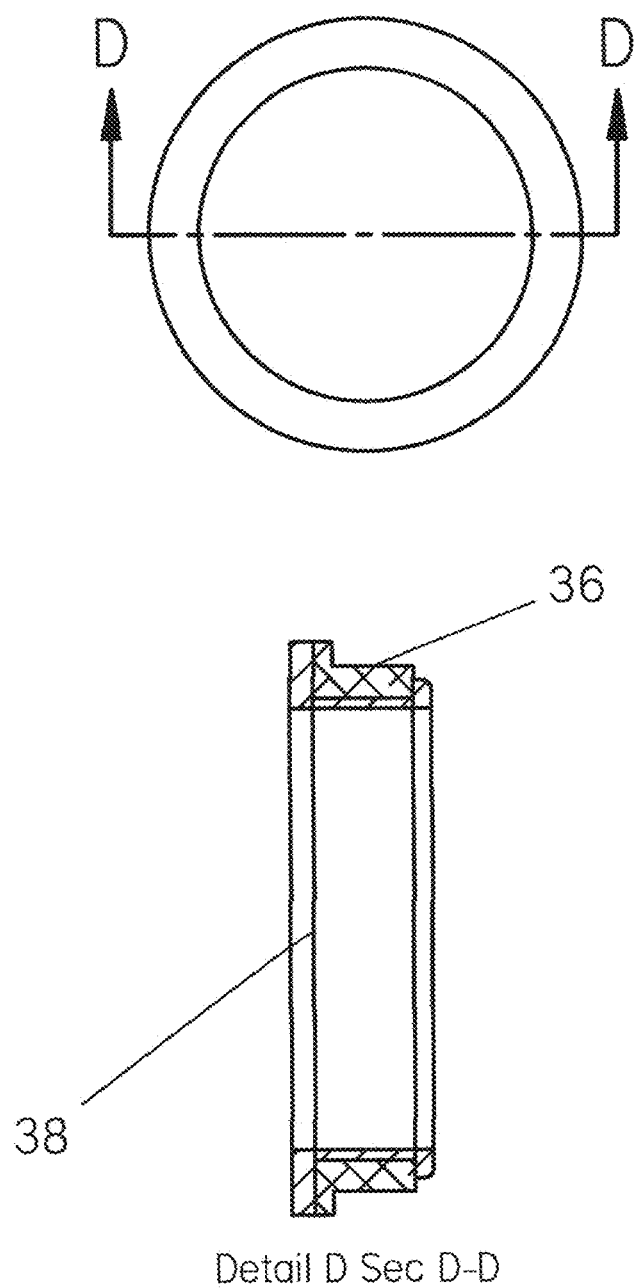
FIG. 14 is front view of a single replaceable bearing journal assembly and section D-D of that assembly.
Figure 15:
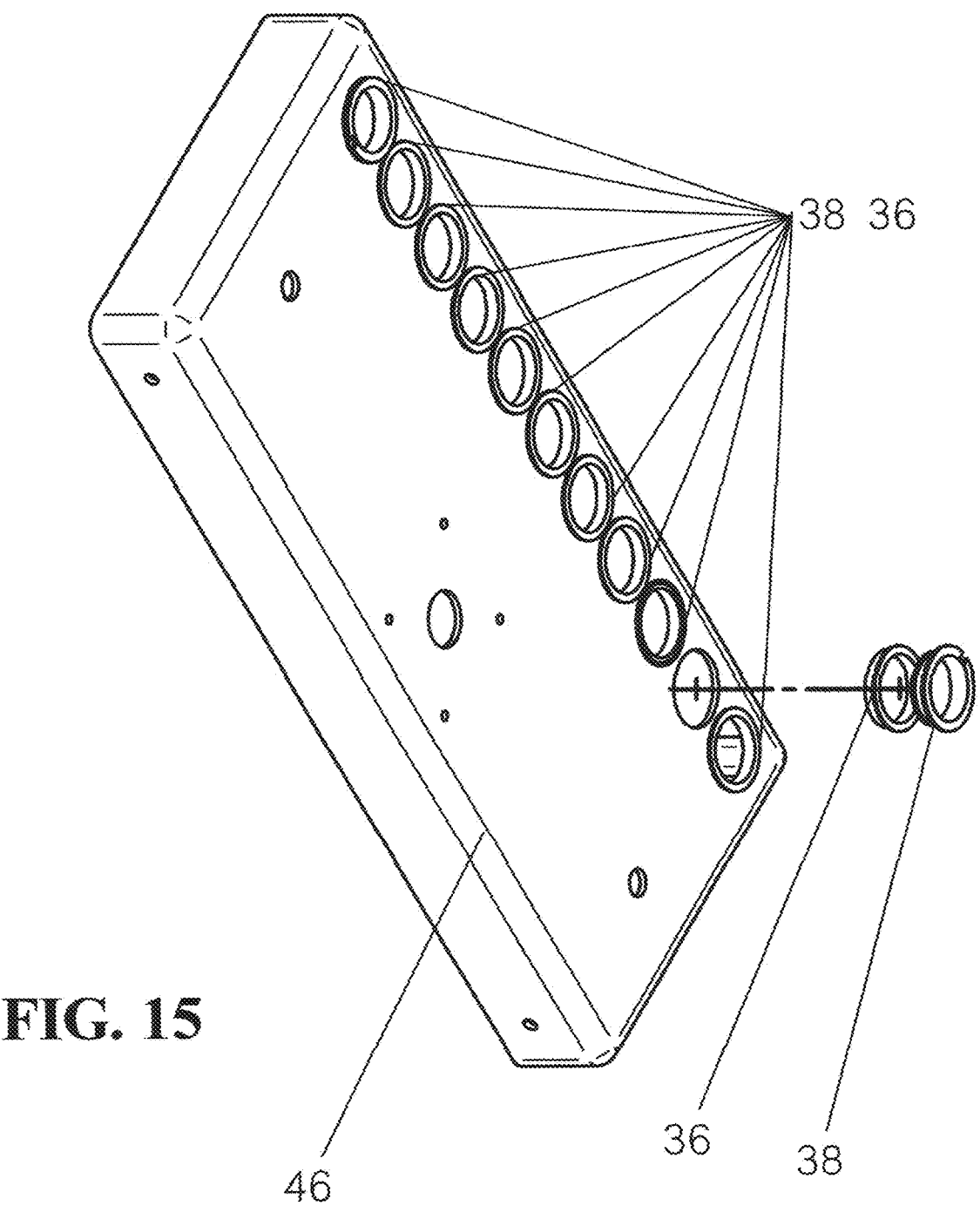
FIG. 15 is an orthographic projection of cast side housing with removable roller bearings and bearing journals.

As shown in FIGS. 5-12, a cam drive 32 mounted to motor 16 provides rotational drive force though pin drive 28 and bearing sleeve 30 to drive plate 26. Drive plate 26 evenly distributes the driving force from motor 16 to drive pins 28 and bearing sleeve 30 attached to roller tubes 60. Drive plate glides 27 position drive plate 26 parallel to face of cam drive 32 and the end of roller tube(s) 60 throughout 360 degree rotation of the cam drive mechanism. Drive plate 26 is retained to cam drive 32 and roller tube(s) 60 by retaining clip(s) 44. Bearing wear distributed evenly across the wider bearing roller 38 and wider bearing land of bearing journal(s) (removable) 36. (or multiple journal insert 54). Bearing journal(s) are replaceable inserts retained into thinner sheet metal housings. Since the journals are independent of the housing(s), all journals and inserts can be made wider the than journal found in prior art. Journal(s) formed into side housing(s) 18 (prior art) bearing(s) 24 (prior art) and bearing land(s) 20 (prior art) are (1.27 millimeter metal thickness to formed profiles up to 4.064 millimeter) 0.050 inches to 0.160 inches sited in prior art and restricted to a forming height of (4.064 millimeter) 0.160 inches being formed by sheet metal CNC fabricators. The new bearing journals 26 are typically made by precision casting, CNC milling or boring machines and CNC lathes. These journals can be cast or machined as single 36 or multiple journals 54 as shown in FIG. 13-15. Tolerances for casting or machining bearing journal(s) 26 are (+/−0.05 millimeter)+/−0.002 inches which improves roller bearing(s) 38 fit to bearing journal(s) 36 to further improve roller bearing(s) and bearing journal(s) life. FIG. 8 and FIG. 6 show how easily single of multiple roller tube(s) 60 can be removed by detaching retaining clips 44 from drive pins 28 leaving the single ended heating elements 40 in place without detaching connecting wiring to heating element(s) 40 located in side housing opposite the drive side. This provides for roller tube(s) 60, roller bearing(s) and/or bearing journal(s) to be removed and replace by less skilled workers in less time (less than 10 min.). FIGS. 9 and 10 show element bearing 34 and drive pin 28 attachments to roller tube 60 that provides support for the non-electrically terminated end of the heating element. FIG. 11 and FIG. 12 Detail B show single ended heating element 40 with electrical terminals 42 on one end of the heating element 40 and located in non-drive side housing.

As shown in FIGS. 13 and 14, replaceable bearing journal 36 is mechanically attached to sheet metal side housing 18 providing a wider precision made bearing land than 0.050 inch thickness of the metal it is formed from. Roller bearing 36 is made wider to fit the wider bearing journal 38 which can be installed on any or all of the holes for roller tube types 18 or 60. Removable bearing journal(s) can be used with prior art chain, gear, or belt drives to extend roller grill life and not dependent on roller grills with cam drive.

Alternate construction shown in FIG. 15, utilizes a cast end housing 16 with replaceable bearing journals 38 and wider roller bearings 36. Cast or molded side housing utilizing removable bearing assemblies for extending the life of the roller grill. Roller bearing 36 is made wider to fit the wider bearing journal 38 which can be installed on any or all of the holes for roller tube types 18 or 60.

Figure 16:
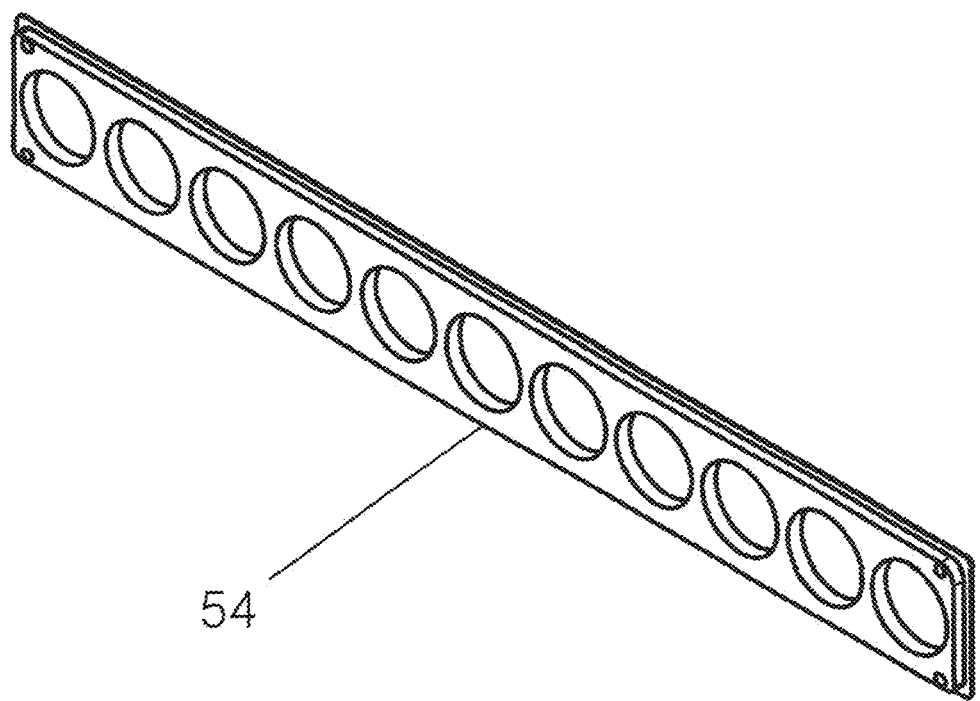
FIG. 16 is an alternate construction of the replaceable multiple journal insert.
Figure 17:
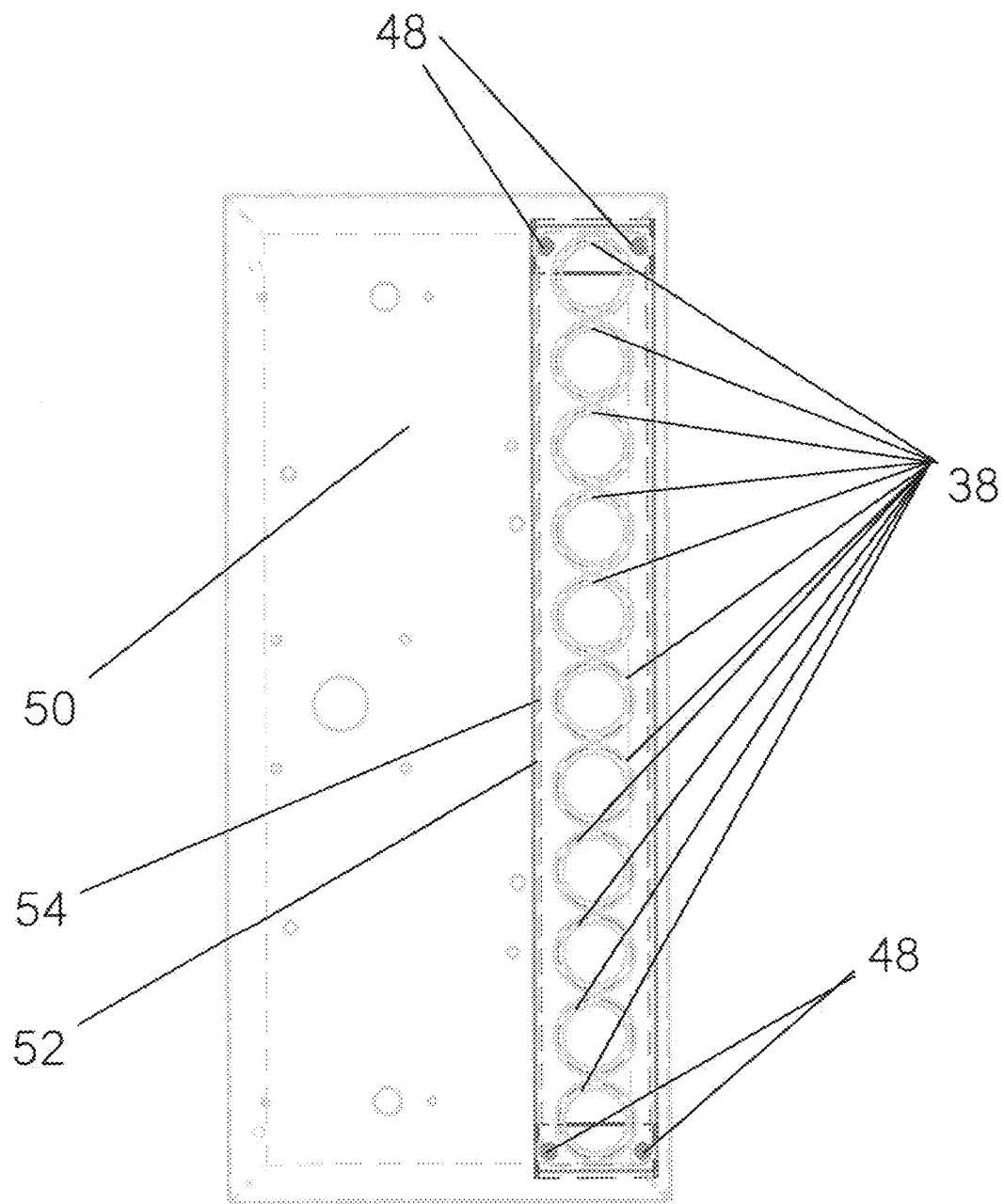
FIG. 17 is an alternate construction of replaceable multiple journal insert assembled to a sheet metal housing.

Alternate construction shown in FIGS. 16 and 17, replaceable precision multiple journals formed, cast or machines into multiple journals insert 54. The insert can be made from any material approved for food contact i.e. hi temperature plastic polymers, zinc, aluminum, chrome plated metals, stainless steel, etc. Side housing 50 shown is FIG. 17 is sheet metal (but can be molded plastic or cast metal) and the insert can be mechanical attached by various common means such as screws, adhesives, sealants, press fit, etc. Food contact approved sealant 52 is used to prevent grease and other contaminants from entering the side housings 18, 46, or 50 around edges of single journal insert 38 or multiple journals insert 54.

With these improvements, it is expected that roller grill life expectancy for bearings and roller tubes can be extended beyond 10 years.

Having thus described the invention, what claimed is:

1. A roller grill assembly for cooking human food, said assembly having a housing and rotatable tubular cooking surfaces mounted between parallel right and left side housings mounted to a center control housing, improvement comprising:

wherein at least two rollers having a pair removable and replaceable ring-shaped bearing journals wider bearing lands for mounting soft plastic ring-shaped bearings at each end of said at least two outer rollers or all rollers having replaceable bearing assemblies; and wherein ring-shaped bearing journal is not formed as part of the side housing but mechanically attached and removable from the side housing; and wherein bearing land(s) are wider than 0.160 inches (4.064 millimeter); and wherein a drive assembly enclosed in either the left or right side housing, the drive assembly is configured to rotate the plurality of tubular heated surfaces between left and right side panels; and wherein roller tubes utilize double ended electric heaters are positioned internally to heat the outer cooking surface; and wherein the drive assembly rotates around and over the heating elements but not crossing over the end of the heating element; and wherein electrical controls are contained within the control housing (grill body) and electrically connected to the heating elements to regulate the surface temperature of the cooking surfaces.

2. The roller grill of claim 1, wherein a means for driving the cylindrical cooking surfaces relative to the side housings can be any commonly used drive such as chain with sprocket mounted to rollers, gear drive, flexible belt and sprocket.

3. The roller grill in claim 2, wherein parallel side housing are provided with holes for mounting the removable bearing journals which can be a sheet metal form, metal casting, or molded plastic polymer.

4. The roller grill in claim 3, wherein parallel side housings are made with rectangular holes to mount replaceable multiple journal inserts of any multiple or combination of multiples including single journals.

5. A roller grill assembly for cooking human food, said assembly having a housing and rotatable tubular cooking surfaces mounted between parallel right and left side housings mounted to a center control housing, improvements comprising:

wherein at least two rollers having a pair removable and replaceable ring-shaped bearing journals with wider bearing lands for mounting soft plastic ring-shaped bearings at each end of said at least two rollers or all rollers having replaceable bearing assemblies; and wherein bearing land(s) are wider than 0.160 inches (4.064 millimeter); and wherein a drive assembly enclosed in either the left or right side housing, the drive assembly is configured to rotate the plurality of tubular heated surfaces; and wherein roller tubes comprising of single ended electric heaters are positioned internally to heat the outer cooking surface; and wherein drive assembly rotates past parallel to the end of the roller tube and electric single ended elements; and wherein roller tubes are removable for cleaning and replacement with electrical disconnection; and wherein roller bearing(s) can be replaced without electrical disconnection of the heating element(s); and wherein bearing journal(s) can be individually replaced in side housing(s); and wherein electrical controls are contained within the control housing and electrically connected to the heating elements to regulate the surface temperature of the cooking surfaces.

6. The roller grill of claim 5, wherein a means for driving the cylindrical cooking surfaces relative to the side housings, cam drive comprising of fewer components to disassemble for servicing bearings, bearing journals, or roller tubes:
  a) an electric motor;
  b) a cam with drive pin;
  c) drive plate;
  d) drive bearings;
  e) roller tube with drive pins;
  f) retaining clips
  g) singled ended heating elements.

7. The roller grill in claim 6, wherein quick release retaining clips are used to release the drive plate from the roller tube(s) and cam drive for quick removal of individually of bearing(s), bearing journal(s), or roller tube(s), drive bearing(s), etc. reducing time and complexity of roller grill service.

8. The roller grill in claim 7, wherein parallel side housing are provided with holes for mounting the removable bearing journals which can be a sheet metal form, metal casting, or molded plastic polymer.

9. The roller grill in claim 8, wherein parallel side housings are made with rectangular holes to mount replaceable multiple journal inserts of any multiple or combination of multiple journal(s) including single journals.

* * * * *